(12) United States Patent
Sun et al.

(10) Patent No.: US 9,640,994 B2
(45) Date of Patent: May 2, 2017

(54) DECOUPLED THREE-PHASE POWER FLOW ANALYSIS METHOD FOR UNBALANCED POWER DISTRIBUTION SYSTEMS

(75) Inventors: Hongbo Sun, Plymouth, MN (US); Anamika Dubey, Austin, TX (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 719 days.

(21) Appl. No.: 13/404,716

(22) Filed: Feb. 24, 2012

(65) Prior Publication Data

US 2013/0226482 A1 Aug. 29, 2013

(51) Int. Cl.
 *G01R 21/06* (2006.01)
 *G01R 19/00* (2006.01)
 *H02J 3/26* (2006.01)

(52) U.S. Cl.
 CPC .................. *H02J 3/26* (2013.01); *Y02E 40/50* (2013.01)

(58) Field of Classification Search
 CPC .............. H02J 3/26; H02J 17/00; Y02E 40/50
 See application file for complete search history.

(56) References Cited

U.S. PATENT DOCUMENTS

| | | | | |
|---|---|---|---|---|
| 4,344,142 A * | 8/1982 | Diehr et al. | .................. | 700/198 |
| 5,317,525 A * | 5/1994 | Taoka | ....................... | G06J 1/00 703/18 |
| 2008/0072182 A1 * | 3/2008 | He | ......................... | G06F 17/504 716/113 |
| 2008/0133201 A1 * | 6/2008 | Guedon | .............. | G06F 17/5018 703/14 |
| 2008/0281474 A1 * | 11/2008 | Patel | ......................... | H02J 3/06 700/298 |
| 2010/0198422 A1 * | 8/2010 | Feng | ..................... | H02J 3/1828 700/291 |
| 2012/0022713 A1 * | 1/2012 | Deaver, Sr. | ............ | G05B 17/02 700/298 |
| 2012/0078436 A1 * | 3/2012 | Patel | ....................... | G06N 3/08 700/298 |
| 2012/0116735 A1 * | 5/2012 | Guedon | .............. | G06F 17/5018 703/2 |
| 2013/0151026 A1 * | 6/2013 | Hughes | ..................... | G06F 1/28 700/297 |

FOREIGN PATENT DOCUMENTS

| | | |
|---|---|---|
| JP | 09107633 A | 4/1997 |
| JP | 09294333 A | 11/1997 |

OTHER PUBLICATIONS

Supreme Court decision (*Alice* vs *CLS Bank*) (2013).*

(Continued)

*Primary Examiner* — Hyun Park
(74) *Attorney, Agent, or Firm* — Gene Vinokur; James McAleenan; Hironori Tsukamoto (57) ABSTRACT

Three phase power flow analysis of an unbalanced power distribution system decouples voltage changes resulting from nodal admittance matrix into one contribution from a real part, conductance matrix, and other contribution from an imaginary part, and a susceptance matrix. A first voltage change and second voltage change resulting from conductance and susceptance matrices are determined respectively. The voltages of a node of the power distribution system are determined as a combination of first and second voltages.

14 Claims, 6 Drawing Sheets

(56) References Cited

OTHER PUBLICATIONS

Garcia et al., "Thre-Phase Power Flow Calculations Using the Current Injection Method," IEEE Transaction on Power Systems (2000).*
Cheng et al., "A Three-Phase Power Flow Method for REal-time Distribution System Analysis," IEEE Transactions on Power Systems (1995).*
Garcia et al., "Three-Phase Flow Calculation Using the Current Injection Method," IEEE Transaction on Power Systems (2000).*
Cheng et al., "A Three-Phase Power Flow Method for Real-Time Distribution System Analysis," IEEE Transaction on Power System (1995).*
Mohammad Hassan, "Recent Developments in Three Phase Load Flow Analysis," UTM (2008).*
Garcia, Paulo AN, et al. "Three-phase power flow calculations using the current injection method." IEEE Transactions on Power Systems 152 (2000): 508-514.
Hatami, A. R, and M. Parsa Moghaddam. "Three-Phase Fast Decoupled Load Flow for Unbalanced Distribution Systems." Iranian Journal of Electrical and Computer Engineering 6.1 (2007): 31.

* cited by examiner

DECOUPLED THREE-PHASE POWER FLOW ANALYSIS METHOD FOR UNBALANCED POWER DISTRIBUTION SYSTEMS

FIELD OF THE INVENTION

This invention relates generally to power distribution systems, and more particularly to three-phase power flow analysis for unbalanced power distribution systems.

BACKGROUND OF THE INVENTION

Power distribution systems deliver electric powers from distributed generators and transmission systems to power consumers. The distribution system may be either a 3-phase 4 wire system, or a 3-phase 3 wire system. The power from the transmission system or the generators is delivered to the consumers through transmission lines, and various voltage regulation devices, such as shunt capacitors, step voltage regulators, and transformers. The consumer loads may be single phase, two-phase or three-phase. The loads may be constant power load, constant current load, or constant impedance load.

Figure 1:
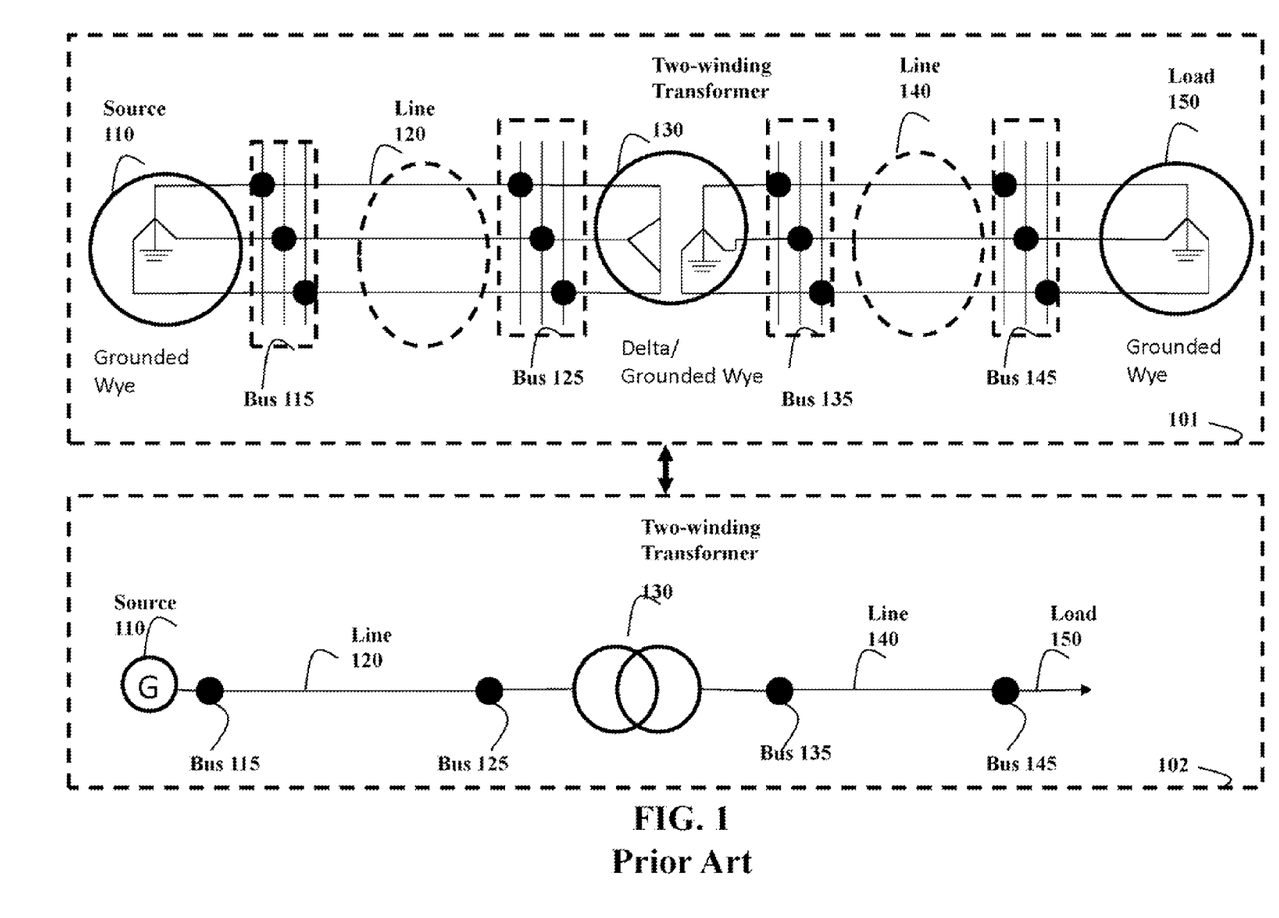
FIG. 1 is an example of a conventional three-phase power distribution system.

FIG. 1 shows schematic diagrams of a sample distribution system including both the three-phase representation 101 and one-line diagram 102. The sample system includes one grounded Wye-connected three-phase source 110, two three-phase transmission lines 120 and 140, one grounded Wye-connected three-phase load 150, and one three-phase transformer 130 with Delta/Grounded Wye connection. There are four three-phase buses in the system, including bus 115, bus 125, bus 135 and bus 145.

The purpose of three-phase power flow analysis is to obtain the voltages at each phase of any bus in the power distribution system, for specified source and load conditions. After the voltages are known, currents and powers in each branch on each phase, as well as the output of the generation sources, can be determined analytically.

The effectiveness of power flow methods are depended on what type of devices is modeled, and how the device is connected within itself and with other devices. The grounded Wye, and Delta are commonly used for the distribution loads, distributed sources or shunt capacitors. The typical connection type of transformer or voltage regulator windings includes grounded Wye, ungrounded Wye, and Delta.

Depending on known parameters, buses of the distribution system can be classified as (1) a swing bus, if the voltage magnitude |V| and the phase angle θ are known; (2) as a PQ bus, if the active power P and the reactive power Q are known; and (3) as a PV bus, if the active power P and voltage magnitude |V| are known. The bus type is determined by the known parameters of connected sources and loads.

Various methods for solving three phase power flow problem are known. Those methods differ in either the form of the equation describing the system, or the numerical techniques used, and usually are either topology based or matrix based. Typical topology based methods include backward/forward sweep method, and ladder method. Typical matrix based methods include implicit Z-bus matrix method, Newton-Raphson method, and Fast Decoupled method. All of those methods have their own limitations when applied to large systems either in modeling capabilities or computational efficiency. The computational efficiency is a major challenges for the admittance matrix methods.

SUMMARY OF THE INVENTION

The objective of various embodiments of invention is providing a fast and accurate method for power flow analysis suitable for large-scale unbalanced power distribution systems. The three phase power flow can be analyzed based on rectangular coordinate equations of nodal current mismatches over nodal voltage changes and a nodal admittance matrix. Typically, the nodal admittance matrix has a large size, e.g., a 12000 by 12000 matrix, and includes a real part and an imaginary part. Considering the fact that rectangular coordinate equations are solved recursively, the size and a structure of the nodal admittance matrix make the power flow analysis slow. In some situations, inefficiency of the power flow analysis prevents its usage for real time applications.

Some embodiments of the invention are based on a realization that the nodal admittance matrix can be decoupled into a conductance matrix corresponding to the real part of the admittance matrix, and a susceptance matrix corresponding to the imaginary part of the admittance matrix. The voltage changes corresponding to the real part and the imaginary part can be separately determined based on the rectangular coordinate equation, such that a voltage change of a bus can be determined as a combination of these voltage changes.

Such decoupling can significantly reduces the computational burden of power flow analysis by replacing the factorization of a large-size nodal admittance matrix with factorization of two small-size ones. Taking a distribution system with 2000 three-phase nodes as an example, a factorization of two 6000 by 6000 matrices is required for the decoupled method compared to a factorization of a 12000 by 12000 matrix for a conventional admittance matrix based method with rectangular coordinates. The relative contribution of conductance and susceptance matrices can be determined based on the diagonals of two matrices and the method is suitable for distribution systems with wide range of ratios of line resistance over reactance.

In some embodiments, impacts of zero-impedance branches such as voltage regulators have been modeled by merging the branches with adjacent impedance branches, and the inaccuracy or divergence problem introduced by adding small impedance into those branches that are used by conventional methods are avoided. Unlike the common practice to set the active power for each phase arbitrarily, the method models the control requirements for three-phase PV buses with balanced voltages precisely. That is, the method maintains the sum of three phase active power constant, and maintains three phase voltages balanced and with constant magnitudes. In addition to the improvement of accuracy, the method also reduces the admittance matrix by merging three phases of PV buses into one phase, and removing one of zero-impedance branch buses from the model.

Also, some embodiments of the invention are based on yet another realization that PV nodes can be converted into PQ ones to be solved by using a PV sensitivity matrix method. The PV sensitivity matrix is easily obtained through Kron reduction of nodal admittance matrix to eliminate the non PV nodes, and used to determine the required amount of reactive power compensation to correct the voltage magnitude mismatches at PV nodes.

Furthermore, instead of setting the bus initial voltages with swing bus values, some embodiments initialize the bus voltages appropriately and, thus, further reduce the number of iterations for converged voltage solutions. For example, the initial bus voltages can be set based on amplifier factors of transformers and regulators along paths connecting each bus with the swing bus.

DETAILED DESCRIPTION OF THE PREFERRED EMBODIMENTS

Decoupled Three-Phase Power Flow

Figure 2:
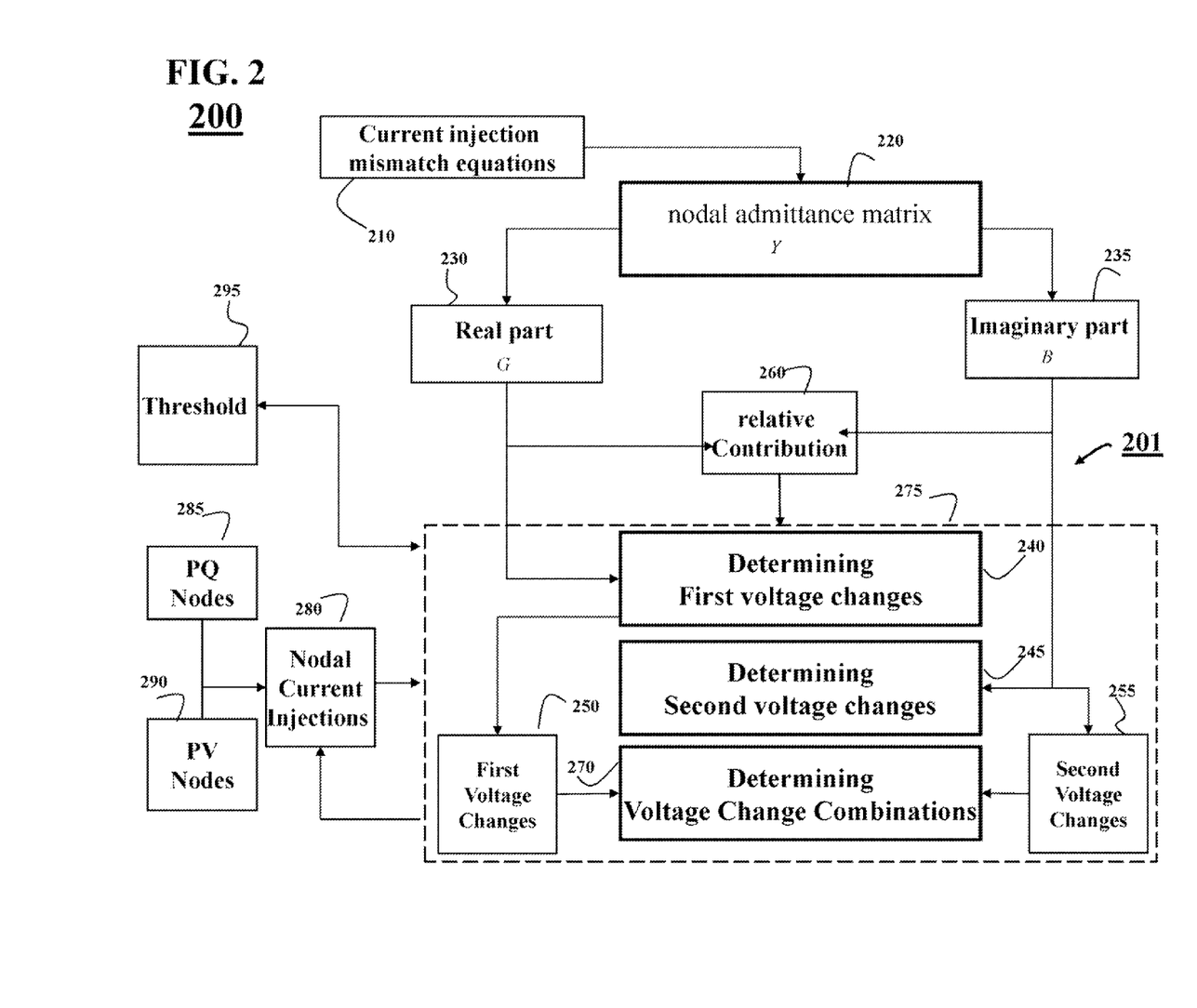
FIG. 2 is a block diagram of a method for three-phase power flow analysis according to some embodiments of invention.

FIG. 2 shows a block diagram of a method 200 for a three phase power flow analysis of a power distribution system, such as an unbalanced distribution system. Based on current injection mismatch formulation 210, the nodal admittance matrix Y 220 of the distribution system is decoupled into a real part 230, conductance matrix G, and an imaginary part 240, susceptance matrix B.

Using polar coordinates, the power flows can be solved by using current injection equations of bus currents over bus voltages and an admittance matrix of the buses:

$$[I] = [Y][V], \quad (1)$$

where, [I] is the vector of equivalent complex current injections for buses, [V] is the vector of complex voltages for the buses, and [Y] is the nodal admittance matrix of the system. In one embodiment, the buses in the system are converted to nodes to be modeled. The total number of nodes for each bus is equal to the number of available or modeled phases at the bus. For example, a three-phase bus is modeled as 3 nodes and each node represents an independent phase. Herein, the terms "bus" and "nodes" are used interchangeably, unless indicated otherwise.

The nodal admittance matrix [Y] can be constructed based on the nodal admittance model for each impedance branch in the system. The constant impedance load and shunt compensation at the bus are treated as self admittances to be embedded into the nodal admittance matrix.

Due to the dependency of nodal current injections on nodal voltages, the solution of Equation (1) is obtained through iteratively solving the following nodal current injection mismatch equations 210:

$$[\Delta I] = [Y][\Delta V] \quad (2)$$

Equation (2) includes the nodes for PQ and PV buses, but excludes the nodes associated with the swing bus because the complex voltages of those nodes are known.

At each iteration, a current injection mismatch for each node [ΔI] is first determined based on the properties of connected loads and sources, and the latest nodal voltages. And then an incremental voltage change [ΔV] is solved using the factorized admittance matrix.

The bus voltages are initialized with the latest measurements or power flow solution. If the information is not provided, the initial voltages for each bus are set as the values at swing bus multiplying with aggregated voltage amplifying factor matrix introduced by the transformers or voltage regulators along the shortest path between the swing bus and the bus:

$$V_p^{(0)} = \prod_{st} A_{V_{st}} V_{swing}, \quad (3)$$

where $V_p^{(0)}$ is the vector of initial complex voltages of bus p, $V_{swing}$ is the complex voltage of the swing bus, $A_{V_{st}}$ is the voltage amplifying factor matrix of a regulator or transformer between two of buses, bus s and bits t located on the shortest path from the swing bus to the bus under the consideration.

The admittance matrix Y 220 includes two integrated parts, i.e., one real part 230, and one imaginary part 235. The real part includes a conductance matrix G, and the imaginary part includes a susceptance matrix B. Accordingly, the Equation (2) can be rewritten in rectangular coordinates as:

$$\begin{bmatrix} \Delta I_r \\ \Delta I_m \end{bmatrix} = \begin{bmatrix} G & -B \\ B & G \end{bmatrix} \begin{bmatrix} \Delta V_r \\ \Delta V_m \end{bmatrix}, \quad (4)$$

where, $\Delta I_r$ and $\Delta I_m$ are the real part and imaginary part of nodal current injection mismatches, and $\Delta V_r$ and $\Delta V_m$ are the real part and imaginary part of incremental nodal voltage changes. Both G and B matrices are contributed to the changes of nodal voltages.

The effects of G and B matrices on nodal voltage changes are decoupled into two separate equations, and each set of equations consider only one matrix's contribution. The final voltage change is formed as a weighted linear combination of two contributions.

Ignoring the effects of B matrix, the nodal voltage changes resulting from G matrix can be determined as:

$$\begin{bmatrix} \Delta I_r \\ \Delta I_m \end{bmatrix} = \begin{bmatrix} G & \\ & G \end{bmatrix} \begin{bmatrix} \Delta V_{r1} \\ \Delta V_{m1} \end{bmatrix}, \quad (5)$$

where, $\Delta V_{r1}$ and $\Delta V_{m1}$ are the corresponding real and imaginary parts of voltage changes resulting from G matrix. Hence, the first set of decoupled equations are given by:

$$[\Delta I_r] = [G][\Delta V_{r1}] \quad (6)$$

$$[\Delta I_m] = [G][\Delta V_{m1}] \quad (7)$$

Ignoring the effects of G matrix, the nodal voltage changes resulting from B matrix can be determined as:

$$\begin{bmatrix} \Delta I_r \\ \Delta I_m \end{bmatrix} = \begin{bmatrix} & -B \\ B & \end{bmatrix} \begin{bmatrix} \Delta V_{r2} \\ \Delta V_{m2} \end{bmatrix} \quad (8)$$

where, $\Delta V_{r2}$ and $\Delta V_{m2}$ are the corresponding real and imaginary parts of voltage changes resulting from B matrix. Similarly, the second set of decoupled equations is given by:

$$[\Delta I_m] = [B][\Delta V_{r2}] \quad (9)$$

$$[\Delta I_r] = -[B][\Delta V_{m2}] \quad (10)$$

The net nodal voltage change is given by a weighted combination of two decoupled voltages:

$$\begin{bmatrix} \Delta I_r \\ \Delta I_m \end{bmatrix} = A \begin{bmatrix} \Delta I_{r1} \\ \Delta I_{m1} \end{bmatrix} + (1-A) \begin{bmatrix} \Delta V_{r2} \\ \Delta V_{m2} \end{bmatrix}, \quad (12)$$

where, A is a diagonal weight matrix that represents the contribution of G matrix towards the whole voltage update, and I is an identity matrix.

The matrix A represents a coefficient of relative contribution of the real part of nodal admittance matrix to the voltage change of the bus. The relative contribution 260 of G matrix can be determined based on the diagonals of G and B matrices.

The voltages of the system are analyzed 275 through several consecutive steps according to various embodiments of the invention. For example, first voltage changes 250 are determined 240 based on the factorized conductance matrix G 230. The second voltage changes 255 are determined 245 based on the factorized susceptance matrix B 235. Then, using the relative contribution factor 260, a combination of voltage changes are determined 270 based on the first voltage change 250, and the second voltage change 255.

Due to the dependence of current injections on nodal voltages, nodal voltages are determined recursively through 275 and 280 until a convergence threshold 295 is satisfied. For example, in one embodiment iteration includes updating 275 the voltages of buses based on the nodal current injections, and conductance and reactance matrices; and updating 280 the nodal current injections based the updated voltage 275 and control properties of PQ nodes 285 and PV nodes 290.

The method 200 can be executed by a processor 201.

Zero-Impedance Branches

Some branches in a power distribution system can be regarded as zero-impedance branches, such as step voltage regulators, switches, ideal transformers, very short lines and jumpers. Usually, conventional methods ignore the impedances of those branches and set the impedances to zero. However, the consequence is that some entries in the resultant nodal admittance matrix are infinite, and thus the admittance matrix based approaches are inapplicable. In order to use admittance matrix based approaches, conventional methods have arbitrarily assigned small non-zero impedances to those branches. However, assigning such small impedances makes the analysis ill-conditioned, and power flows are difficult to converge.

Accordingly, some embodiments of the invention merge zero-impedance branches with adjacent impedance branches to model as new non-zero impedance branches.

Figure 3:
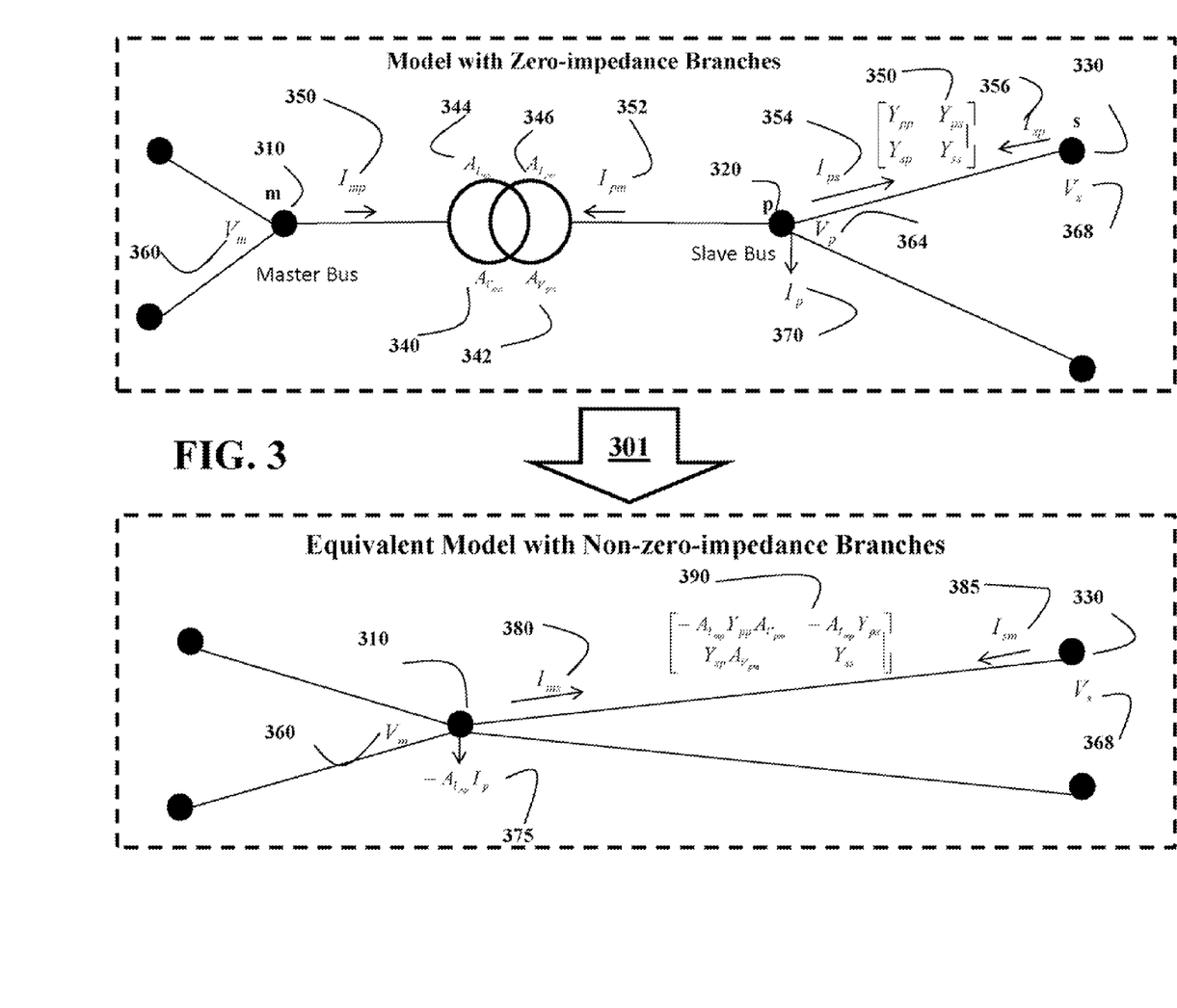
FIG. 3 is an example of transforming a distribution system with three-phase zero impedance branches to an equivalent model of distribution system with non-zero impedance branches according to some embodiments of the invention.

FIG. 3 shows an example of determining 301 an equivalent distribution system with only non-zero impedances branches, by merging a zero-impedance branch and an adjacent impedance branch into a new impedance branch and set its nodal admittance matrix based on the admittance matrix of the adjacent branch and the amplifying factor matrix of the zero-impedance branch. For example, the branch between bus in 310 and bus p 320 represents a generalized three-phase zero-impedance branch. One of the buses, for example the bus 310 is assigned to be a master bus, and the other bus is assigned as slave bus. The buses are connected by an ideal transformer. The slave bus is connected with a load current $I_p$ 370. The transformer's functionality are represented by two voltage amplifying factor matrices, $A_{V_{mp}}$ 340 and $A_{V_{pm}}$ 342, and two current amplifying factor matrices, $A_{I_{mp}}$ 344 and $A_{I_{pm}}$ 346. Those amplifying factor matrices are determined by the winding connection and tap positions for a transformer or a voltage regulator; and by the phase connection for a switch, a short line or a jumper cable.

The phase currents entering through the master bus m 310, $I_{mp}$ 350 can be determined by multiplying the phase currents entering through slave bus $I_{pm}$ 352 with amplifying factor matrix $A_{I_{mp}}$ 344 according to $$I_{mp} = A_{I_{mp}} I_{pm} \quad (13)$$

Reversely, the phase currents entering through the slave bus $I_{pm}$ 352 can be determined by multiplying the phase currents entering through master bus $I_{mp}$ 350 with amplifying factor matrix $A_{I_{pm}}$ 346 according to $$I_{pm} = A_{I_{pm}} I_{mp} \quad (14)$$

The phase-to-ground voltages at the master bus $V_m$ 360 can be determined by multiplying the phase-to-ground voltages at slave bus $V_p$ 364 with amplifying factor matrix $A_{V_{mp}}$ 340 according to $$V_m = A_{V_{mp}} V_p \quad (15)$$

and the voltages at the slave bus $V_p$ 364 can be determined by multiplying the voltages at master bus $V_m$ 360 with amplifying factor matrix $A_{V_{pm}}$ 342 according to $$V_p = A_{V_{pm}} V_m \quad (16)$$

As shown in FIG. 3, a zero-impedance branch, in a distribution system, is merged into adjacent impedance branches, such that the slave bus is not considered in analysis of the model. In example of FIG. 3, the zero-impedance branch is connected to two branches by the slave bus 320, and to another two branches by the master bus 310. Taking one adjacent branch between slave bus p 320 and bus s 330 as example, the relationship between the branch currents, and bus voltages for the branch can be described by Equation (17), 350:

$$\begin{bmatrix} I_{ps} \\ I_{sp} \end{bmatrix} = \begin{bmatrix} Y_{pp} & Y_{ps} \\ Y_{sp} & Y_{ss} \end{bmatrix} \begin{bmatrix} V_p \\ V_s \end{bmatrix} \quad (17)$$

wherein $I_{ps}$ 354 and $I_{sp}$ 356 are the vectors of phase currents flowing through the bus p 320, and the bus s 330 into the branch respectively. $V_p$ 364 and $V_s$ 368 are the vectors of phase voltages at bus p 320 and bus s 330, $Y_{pp}$ and $Y_{ss}$ are self admittance matrix of the branch at the bus p, and the bus s, and $Y_{ps}$ and $Y_{sp}$ are mutual admittance matrices of the branch between the bus p and the bus s, and the bus s and the bus p, respectively. The dimension of those vectors and matrices can be determined by the available phases on the branch and two terminal buses. For example, for a three-phase branch, all branch currents and bus voltages can be 3 by 1 vectors, and the self and the mutual admittance matrices can be 3 by 3 matrices. Equation (17) can be used for any impedance devices in the distribution systems.

In the equivalent model, the zero-impedance branch and the slave bus p 320 are removed. There are no changes for the branches connected to the master bus in 310. The branches connected to the slave bus p 320 are reconnected to bus in 310, and the branch admittance matrices and the current injections at the master bus m 310 are modified accordingly.

The load currents $I_p$ 370 at bus p 320 are modeled as equivalent currents at bus m 310, as $-A_{I_{mp}}I_p$ 375. The branch between the bus p 320 and the bus s 330 in the system is replaced with a new branch directly between the bus in 310 and the bus s 330, and the branch currents, $I_{ms}$ 380, $I_{sm}$ 385 and nodal voltages, $V_m$ 360 and $V_s$ 368 are related as $$\begin{bmatrix} I_{ms} \\ I_{sm} \end{bmatrix} = \begin{bmatrix} -A_{I_{mp}}Y_{pp}A_{V_{pm}} & -A_{I_{mp}}Y_{ps} \\ Y_{sp}A_{V_{pm}} & Y_{ss} \end{bmatrix} \begin{bmatrix} V_m \\ V_s \end{bmatrix}. \quad (18)$$

The self admittance at the bus in 310 is determined from the negative product of current amplifying matrix $A_{I_{mp}}$ 344, self admittance at the bus p, and voltage amplifying matrix $A_{V_{pm}}$ 342. The mutual admittance for bus in 310 to bus s 330 is the negative product of current amplifying matrix, $A_{I_{mp}}$ 344 and mutual admittance for bus p 320 to bus s 330. The mutual admittance for bus s 330 to bus m 310 is the product of mutual admittance for bus s 330 to bus p 320 and voltage amplifying matrix $A_{V_{pm}}$ 342.

Three-Phase PV Buses with Balanced Voltages

Figure 4:
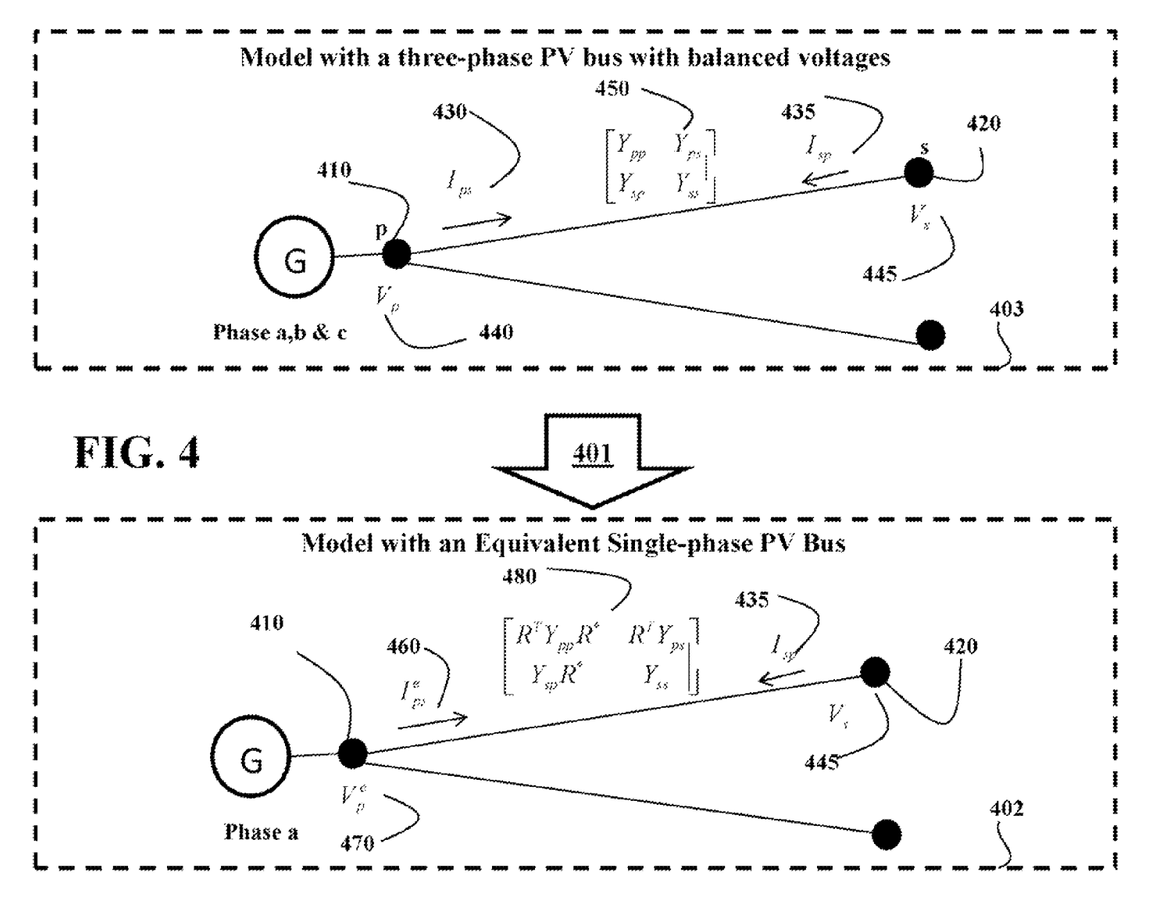
FIG. 4 is an example of transforming a distribution system with three-phase balanced voltage PV bus into to an equivalent model of a distribution system with an equivalent single-phase PV bus according to some embodiments of the invention.

FIG. 4 shows an example of determining 401 an equivalent model 402 for a model 403 of the power distribution system with three-phase ganged regulated PV buses. The PV bus in the distribution system can be modeled as three PV nodes if power and voltage magnitude of each phase is regulated independently. However, in various embodiments, the PV bus is connected to a three-phase synchronous generator. The three phases of the generator is balanced, that is three phases have same magnitude of voltages, and constant phase angle difference between each two phases such that phase a always leads phase b 120 degree, and lags phase c 120 degree. The regulated parameters of the generator are the magnitude of balanced voltages and the total active power of three phases. Accordingly, in some embodiments, the three-phase PV bus has been merged into one single phase PV bus to be modeled in admittance matrix based power flow equations.

For example, one embodiment transforms a model of a distribution system with three phase PV buses to an equivalent distribution system model with equivalent single-phase PV buses. The total power generation $S_p$ of a three phase PV bus p 410 can be determined as the summation of phase powers for all phases, and for any phase x, the phase power at the phase is the product of phase to ground voltage $V_p^x$ and the conjugate of phase current $I_p^{x*}$. Thus, the total power generation $S_p$ can be determined according to $$S_p = \sum_{x \in \{a,b,c\}} V_p^x I_p^{x*}. \quad (19)$$

In one embodiment, the three phases a, b, and c are combined as an equivalent single-phase e. The equivalent phase e can be any phase. Taken phase a as an example, the phase voltage for the equivalent phase can be set as the same as the selected phase:

$$V_p^e = V_p^a \quad (20)$$

The current at the equivalent phase e, $I_p^e$ can be calculated as the summation of all three phase currents after rotated to the selected phase, e.g., currents at the phase b and at the phase c are rotated 120 degree, and −120 degree respectively, before adding them to the current of the phase a. The equivalent current is calculated by multiplying the three phase current vector, $I_p$ with a transpose of rotation vector R according to $$I_p^e = R^T I_p \quad (21)$$

Both vectors $I_p$ and R are 3×1 vectors. The rotation vector is used to represent the rotation factor required for each phase. Taking the phase a as the equivalent phase, the rotation vector is defined as:

$$R = \begin{bmatrix} 1 \\ e^{j120°} \\ e^{-j120°} \end{bmatrix}. \quad (22)$$

The total power of three phases at bus p can be replaced with the power at equivalent phase:

$$S_p = V_p^e I_p^{e*} \quad (23)$$

The nodal admittance model for each branch connected with the three-phase PV bus needs to be modified accordingly. In the FIG. 4, the three phase PV bus p 410 is connected to two branches. Taking one branch between bus p 410 and bus s 420 as example, $I_{ps}$ 430 and $I_{sp}$ 435 are the vectors of phase currents entering into the branch through the bus p, and the bus s respectively. The relationship between the phase currents and phase to ground voltages is described by Equation (17), 450, $Y_{pp}$ and $Y_{ss}$ are self admittance matrix of the branch at the bus p, and the bus s, and $Y_{ps}$ and $Y_{sp}$ are mutual admittance matrices between the bus p and the bus s, and the bus s and the bus p, respectively.

In the equivalent model, the three phases of PV bus with balanced voltages are combined into one single phase, and the new branch model can be described as:

$$\begin{bmatrix} I_{ps}^e \\ I_{sp} \end{bmatrix} = \begin{bmatrix} R^T Y_{pp} R^* & R^T Y_{ps} \\ Y_{sp} R^* & Y_{ss} \end{bmatrix} \begin{bmatrix} V_p^e \\ V_s \end{bmatrix}, \quad (24)$$

where $I_{ps}^e$ 460 is the vector of equivalent current entering through bus p, and $V_p^e$ 470 is the vector of phase to ground voltage of bus p on the selected phase e, $I_{ps}^e$ 460 and $V_p^e$ 470 are 1 by 1 vectors, and $I_{sp}$ 435 and $V_s$ 445 are 3 by 1 vectors. The admittance matrix 480 of the equivalent branch is a 4 by 4 matrix. The self admittance at the bus p 410 is determined from the product of transposed rotation vector, self admittance of the branch at bus p 410, and the conjugate of rotation vector. The mutual admittance for the bus p 410 to the bus s 420 is the product of transposed rotation vector and mutual admittance for bus p 410 to the bus s 420. The mutual admittance for the bus s 420 to the bus p 410 is the product of the mutual admittance for the bus s 420 to the bus p 410 and the conjugate of rotation vector.

Equivalent Nodal Current Injections

The calculation of nodal current injection mismatches are depended on the associated bus type that itself is determined by the type of distribution loads, or the regulation type of equivalent sources or distribution generations connected to the bus. The buses connected with constant power loads, or constant current loads are modeled as PQ buses. The constant power load has given the specified active and reactive power injection at the node. The constant current load is converted to equivalent injected powers to be modeled. The equivalent injected powers are based on estimated voltages, and recalculated when the updated voltages become available during the iterations of the solution.

The equivalent sources, which represent the impacts of transmission systems on the distribution systems, are modeled as swing buses or PV buses. Dependent on the regulation patterns, the buses connected with distribution generators can be modeled as either PQ or PV buses. The buses connected to the constant power factor generators are treated as PQ buses. For the constant power factor generator, the specified values are the active power output and power factor. The buses connected to constant voltage generators are treated as PV buses, and the specified values are the outputs of the active power and the magnitudes of bus voltages.

The equivalent current injection mismatch of a PQ bus i at phase x, $\Delta I_i^x$ can be determined based on the scheduled power injections and the calculated equivalent current:

$$\Delta I_i^x = \frac{P_i^{x-sch} - jQ_i^{x-sch}}{V_i^{x(k)}} - I_i^{x(k)} \quad (25)$$

$$x = \{a, b, c, e\},$$

where, $P_i^{x-sch}$ and $Q_i^{x-sch}$ are the scheduled power injections for bus i at phase x, $V_i^{x(k)}$ is the voltage of bus i at phase x obtained at latest iteration k, $I_i^{x(k)}$ is the equivalent current injections calculated with equation (1) based on the voltages at iteration k, and phase x can be one of phase a, phase b, phase c, or equivalent phase e.

The scheduled active power $P_i^{x-sch}$ and reactive power $Q_i^{x-sch}$ are given and kept constant during the iterations for a constant power load or a PQ type generation, but are recalculated when the voltages are updated for a constant current load.

The PV bus uses the same equation (25) to determine the equivalent current injection mismatches. The scheduled active power is specified by the generation regulation specification. The scheduled reactive power is initialized with the latest power flow solution or measurements. If such information is not provided, the scheduled reactive power is determined by an estimated power factor at the first iteration. The power factor can be a given rated power factor of the generator, or the average power factor of the system loads if the rated power factor is not provided. The scheduled reactive powers for the iterations after the first one are updated based on the difference between the scheduled and solved voltages. When a converged power flow is obtained, if the voltage magnitude at PV nodes are not equal to the scheduled values, reactive powers are adjusted to maintain the scheduled voltages at the PV nodes.

The required amount of compensation currents that applied to the bus to eliminate the voltage magnitude mismatch can be determined as:

$$[\Delta I_C] = [Y_C][\Delta V_C], \quad (26)$$

where, $[\Delta I_C]$ is the vector of compensated currents for the PV nodes, $[\Delta V_C]$ is the vector of required voltage changes, and $[Y_C]$ is a sensitivity matrix of nodal compensation current with respect to nodal voltage changes for the PV nodes. The dimension of $[Y_C]$ is equal to the number of PV nodes. The sensitivity matrix is derived from the admittance matrix $[Y]$ in Equation (2) using an Kron reduction method, and all elements related to all non PV nodes are eliminated. The compensation current vector contains one element for each three phase ganged regulated PV buses, and three for each three phase independent regulated PV buses.

Assuming that the phase angles of node voltage kept the values at the latest iteration k, the required voltage change for a PV bus i at phase x, $\Delta V_{C_i}^x$ can be determined as $$\Delta V_{C_i}^x = (|V_i^{x-sch}| - |V_i^{x(k)}|)V_i^{x(k)}/|V_i^{x(k)}| \; x = \{a,b,c,e\}, \quad (27)$$

where $|V_i^{x-sch}|$ is the scheduled voltage magnitude for bus i at phase x.

Solving the equation (26), an approximated compensated currents can be determined to eliminate the magnitude mismatch at the last iteration. Then the required compensated reactive power at bus i on phase x, $\Delta Q_i^{x-sch}$ can be determined as:

$$\Delta Q_i^{x-sch} = Im\{V_i^{x(k)} \Delta I_{C_i}^{x*}\} \; x = \{a,b,c,e\} \quad (28)$$

where, $\Delta I_{C_i}^{x*}$ is the conjugate of compensated current at bus i on phase x, $Im\{\bullet\}$ is the imaginary part of complex number. To avoid over-adjustments, the compensated reactive power may be scaled down accordingly, if it is greater than a given maximum step change, or the resulting reactive power generation is over the maximum capacity of the generator or source.

The required reactive power generation for a PV bus is determined according to:

$$Q_i^{x-sch} = Q_i^{x-sch(k)} + \Delta Q_i^{x-sch} \; x = \{a,b,c,e\}, \quad (29)$$

where $Q_i^{x-sch(k)}$ is the scheduled reactive power calculated at last iteration k.

G matrix Contribution Factors

The convergence performance of the method is depending on the selection of contribution factors of conductance and susceptance matrices. The nodes in the system are partitioned into two groups based on the relative magnitude of corresponding diagonals of conductance and susceptance matrices, one is the set of nodes that the conductance are greater than susceptance, and the other is that conductance less than susceptance. A uniform contribution factor is used for each group. The maximum ratio of conductance over susceptance is used to set the contribution factor of the first group, and the minimum ratio is used for the second group. Only one uniform contribution factor is used if all nodes belong to the first, or second group.

Figure 5:
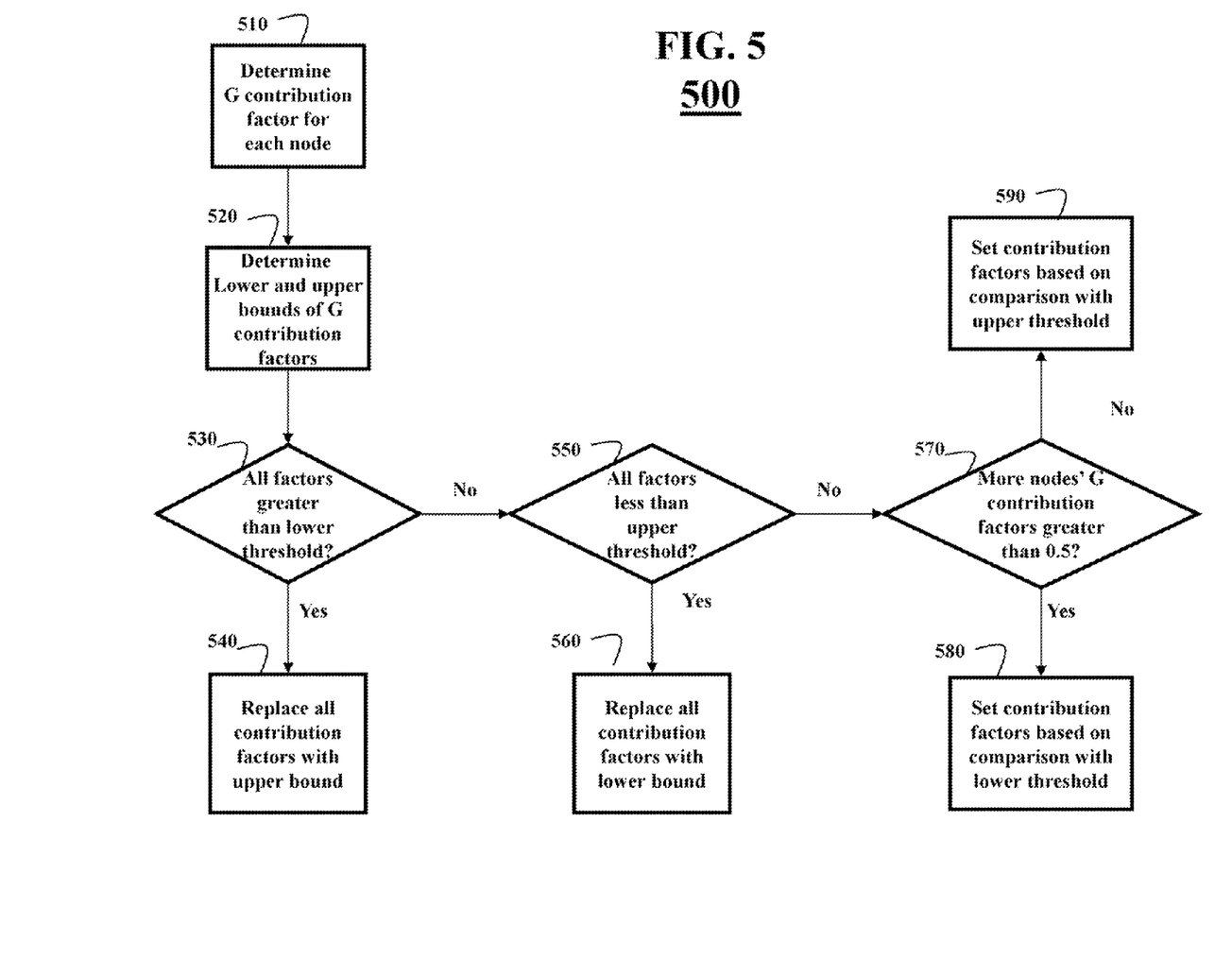
FIG. 5 is an example of determining relative contribution factors of conductance matrix.

FIG. 5 shows a computational procedure 500 for determining the optimal value of relative contribution factors based on the diagonals of nodal conductance and susceptance matrices. Two control parameters, a lower ratio threshold $\underline{\alpha}$, e.g. 0.45 and a upper ratio threshold $\overline{\alpha}$, e.g. 0.55 are used to help determining the contribution factor for each node.

In step 510, the contribution factor of G matrix for each node is determined based on the diagonals of G and B matrices at the corresponding row:

$$\alpha_i = \frac{|g_{ii}|}{|g_{ii}| + |b_{ii}|} \quad (30)$$

where, $\alpha_i$ is the G contribution factor for the i-th row, $g_{ii}$ and $b_{ii}$ are the i-th diagonal elements of G and B matrices respectively.

In step 520, the lower and upper bounds for G contribution factors are determined as follows:

$$\alpha^{max} = \max_i \alpha_i \qquad (31)$$

$$\alpha^{min} = \min_i \alpha_i \qquad (32)$$

In step 530, the G contribution factors for all nodes are compared against the lower ratio threshold $\underline{\alpha}$. If all factors are greater than the lower threshold, the method proceeds to next step 540. Otherwise, the method proceeds to step 550.

In step 540, the G contribution factor $\alpha_i$ of all nodes are replaced with the upper bound $\alpha^{max}$.

In step 550, the G contribution factors for all nodes are compared against the upper ratio threshold $\overline{\alpha}$. If all factors are less than the upper threshold, the method proceeds to next step 560. Otherwise, the method proceeds to step 570.

In step 560, the G contribution factor $\alpha_i$ of all nodes are replaced with the lower bound $\alpha^{min}$.

In step 560: Count the total number of nodes that G matrix contribution is more than B matrix, that is the G contribution factor $\alpha_i$ is greater than 0.5. If more nodes have more G contributions than B, the method proceeds to next step 580. Otherwise, the method proceeds to step 590.

In step 580, the G contribution factor $\alpha_i$ is replaced with the upper bound $\alpha^{max}$ for all nodes that have a contribution factor greater than the lower ratio threshold $\underline{\alpha}$, and with the lower bounds $\alpha^{min}$ for the remaining rows.

In step 590, the G contribution factor $\alpha_i$ is replaced with the upper bound $\alpha^{max}$ for all nodes that have a contribution factor greater than a upper ratio threshold $\overline{\alpha}$, and with the lower bounds $\alpha^{min}$ for the remaining rows.

EXAMPLE

Figure 6:
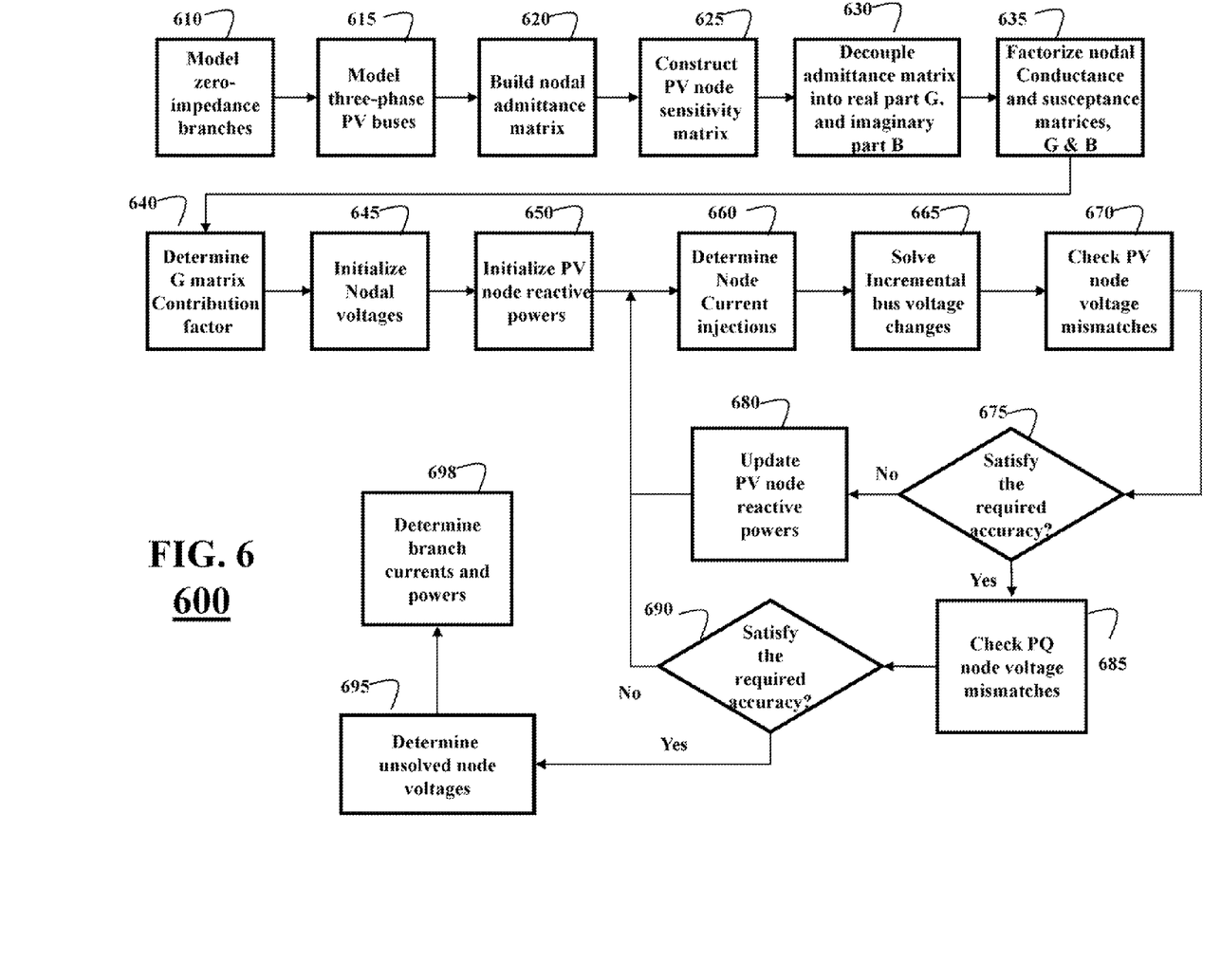
FIG. 6 is a block diagram of a decoupled three-phase power flow method for analyzing a model of an unbalanced power distribution system according to some embodiments of the invention.

FIG. 6 shows a block diagram of a method 600 for analyzing a model of an unbalanced power distribution system according to one embodiment of the invention. Various embodiments of invention use at least part of the steps of the method 600.

In step 610, the slave bus of a zero-impedance branch is removed and the zero-impedance branch and its adjacent impedance branch are replaced with a new branch between the master bus of zero-impedance branch and one of adjacent branch buses as shown in FIG. 3. The nodal admittance of new branch is determined based on the nodal admittance matrix of adjacent branch and voltage and current amplifying factor matrices of zero-impedance branch. The load at the slave bus is modeled as an equivalent load at the master bus.

In step 615, the method determines the nodal admittance matrix of impedance branch connected with three phase PV buses with balanced voltages by replacing the three-phase PV bus with an equivalent single-phase PV bus model as shown in FIG. 4.

In step 620, the method constructs the nodal admittance matrix for the system based on the nodal admittance matrix for each impedance branch including the new branches or branch model constructed in step 610 and step 615.

In step 625, the method determines the PV node sensitivity matrix by using Kron reduction to the nodal admittance matrix to eliminate all nodes except PV nodes.

In step 630, the nodal admittance matrix is decoupled into real part, conductance matrix G and imaginary part, susceptance matrix B. In step 635, the conductance and susceptance matrices, G and B are factorized using sparse Lower and Upper triangular decomposition if the matrices are unsymmetrical, or sparse Cholesky decomposition if the matrices are symmetrical. In step 640, the G matrix contribution factors are determined using a computational procedure based the diagonals of nodal conductance and susceptance matrices as shown in FIG. 5.

In step 645, the voltage of each bus are initialized based on the voltage of swing bus and the aggregated voltage amplifying factor matrix introduced by the transformers and regulators on the shortest path from the swing bus to the study bus. In step 650, the reactive power outputs of PV buses are initialized based on the rated power factor of generators connected to the bus, or average power factor of total loads in the system if the rated power factor is unknown.

In step 660, the method determines the equivalent current injection mismatches for each node based on the latest voltages. In step 665, the method solves the voltage changes contributed from G matrix and B matrix respectively, then combines two solutions together based on the G matrix contribution factors determined in step 640. In step 670, the maximum voltage magnitude difference between the actual and scheduled values for each PV bus is determined. In step 675, the required accuracy is tested, and execution proceeds to step 685, if the mismatches are less than given maximum tolerance, or, otherwise, to step 680. In step 680, the method adjusts the reactive power outputs for PV buses based on the voltage magnitude difference determined in step 670 and sensitivity matrices in step 625.

In step 685, the method determined the voltage mismatches for all PQ buses between current iteration and last iteration. In step 690, if the mismatches are less than given maximum tolerance, a converged solution is obtained, and then the method proceeds to step 695. Otherwise, the method proceeds to step 660 to execute next iteration. In step 695, the method determines the voltages for unsolved slave buses of zero-impedance branches, and unsolved phases for PV buses with balanced three-phase voltages. In step 698, the method determines the currents and powers for each branch in the systems based the full set of voltages for the system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, and data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for a three phase power flow analysis of an unbalanced power distribution system based on a current injection mismatch equation of a nodal current mismatch over a nodal voltage change and an nodal admittance matrix, wherein the nodal admittance matrix includes a real part represented by a conductance matrix and an imaginary part represented by a susceptance matrix, comprising:
determining, based on the current injection mismatch equation, a first voltage change corresponding to the conductance matrix;
determining, based on the current injection mismatch equation, a second voltage change corresponding to the susceptance matrix;
determining the nodal voltage change as a combination of the first voltage change and the second voltage change; and
updating, using at least one voltage regulation device, voltages on three phases of the power distribution system based on the nodal voltage change to balance the voltages on three phases of at least some buses of the power distribution system, wherein at least some steps of the method are performed by a processor.

2. The method of claim 1, further comprising:
determining a coefficient of relative contribution based on diagonals of conductance and susceptance matrix; and
determining the nodal voltage change based on the first voltage change, the second voltage change, and the coefficient of relative contribution.

3. The method of claim 1, wherein the current injection mismatch equation is solved recursively, and wherein the first voltage change, and the second voltage change are updated for each recursion.

4. The method of claim 1, further comprising:
determining current injection mismatches of buses including constant active power and voltage magnitude (PV) buses;
initializing voltages of the buses based on a voltage of a swing bus and a topology of the power distribution system;
determining voltages of each node of the distribution system recursively until a convergence threshold is satisfied, wherein each iteration includes
updating the current injection mismatch based on voltages of each bus;
updating the voltages of buses based on the voltage changes and relative conductance matrix contribution factors.

5. The method of claim 4, wherein the initializing comprises:
initializing the voltages based on amplifier factors of transformers and regulators along the shortest path connecting each bus with the swing bus.

6. The method of claim 4, further comprising:
initializing an equivalent power injections for a PV bus with a rated power factor, or average power flow of total system load if a rated one is unavailable; and
updating the equivalent power injections for a PV bus based on a sensitivity matrix and mismatches between the specified and solved values of voltage magnitude at the bus.

7. The method of claim 4, further comprising:
determining the convergence criteria as a maximum voltage update during a current iteration; and
comparing the convergence criteria with a threshold to determine a convergence of the iterations.

8. The method of claim 4, further comprising:
determining the voltages for three phases of the PV bus based on the voltage of the PV bus determined for a model of the single phase bus.

9. The method of claim 1, further comprising:
merging a zero-impedance branch and an adjacent impedance branch into an new impedance branch and set its nodal admittance matrix based on an admittance matrix of the adjacent branch and an amplifying factor matrix of the zero-impedance branch.

10. The method of claim 9, further comprising:
determining the voltage of the bus with the zero-impedance branch based on a voltage of the adjacent bus and the amplifying factor matrix of the zero-impedance branch.

11. The method of claim 1, further comprising:
determining a nodal admittance matrix for an impedance branch connected to a three phase PV bus based on a model of a single phase bus, wherein a phase of the single phase bus corresponds to a sum of three phases of the PV bus, and wherein the updating the voltages of buses is based on the nodal admittance matrix.

12. The method of claim 1, further comprising:
determining a current and a power for each branch in the power distribution system based on the voltages of the buses.

13. A system for a three phase power flow analysis of an unbalanced power distribution system based on a current injection mismatch equation of a nodal current mismatch over a nodal voltage change and an nodal admittance matrix, wherein the nodal admittance matrix includes a real part represented by a conductance matrix and an imaginary part represented by a susceptance matrix, comprising:
a processor for
determining, based on the current injection mismatch equation, a first voltage change corresponding to the conductance matrix; and
determining, based on the current injection mismatch equation, a second voltage change corresponding to the susceptance matrix;
determining the nodal voltage change as a combination of the first voltage change and the second voltage change; and
at least one voltage regulation device updating the voltages on three phases in the unbalanced power distribution system based on the nodal voltage change to balance the voltage on three phases of at least some buses of the power distribution system.

14. The system of claim 13, further comprising:
a memory for storing a factorized conductance and susceptance matrix of the power distribution system.

\* \* \* \* \*